US009396171B2

(12) United States Patent
Bitonti et al.

(10) Patent No.: US 9,396,171 B2
(45) Date of Patent: Jul. 19, 2016

(54) ADAPTIVE PARSING OF SPARSE XML DATA

(75) Inventors: Thomas Bitonti, Cary, NC (US); Dana Lea Price, Cary, NC (US); Wendell Jack Bouknight, Jr., Clayton, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1187 days.

(21) Appl. No.: 12/061,502

(22) Filed: Apr. 2, 2008

(65) Prior Publication Data
US 2009/0254806 A1 Oct. 8, 2009

(51) Int. Cl.
*G06F 17/22* (2006.01)

(52) U.S. Cl.
CPC ........ *G06F 17/2247* (2013.01); *G06F 17/2252* (2013.01)

(58) Field of Classification Search
USPC .................................. 715/234, 237
See application file for complete search history.

(56) References Cited

U.S. PATENT DOCUMENTS

| 6,635,088 | B1* | 10/2003 | Hind et al. ................ 715/236 |
| 7,062,708 | B2 | 6/2006 | Mani et al. |
| 7,292,160 | B1* | 11/2007 | Wang .......................... 341/51 |
| 7,490,073 | B1* | 2/2009 | Qureshi et al. ................ 706/50 |
| 7,496,837 | B1* | 2/2009 | Larcheveque et al. ........ 715/237 |
| 7,562,079 | B2 | 7/2009 | Barker et al. |
| 7,913,163 | B1* | 3/2011 | Zunger ............. G06F 17/30864 715/234 |
| 8,949,710 | B2 | 2/2015 | Fan et al. |
| 2003/0051056 | A1* | 3/2003 | Pascual et al. ................ 709/247 |
| 2004/0015827 | A1* | 1/2004 | Nicolle et al. ................ 717/104 |
| 2004/0060003 | A1* | 3/2004 | Mani et al. .................... 715/513 |
| 2006/0184888 | A1* | 8/2006 | Bala ..................... G06F 9/4446 715/762 |
| 2006/0190561 | A1* | 8/2006 | Conboy ............ G06F 17/30864 709/217 |
| 2006/0256813 | A1* | 11/2006 | Brusca .............. H04L 29/12301 370/466 |
| 2007/0022430 | A1 | 1/2007 | Barker et al. |
| 2007/0136412 | A1* | 6/2007 | Oba et al. ...................... 709/200 |

OTHER PUBLICATIONS

Michael Floyd; Special Edition Using XSLT; Jan. 30, 2002; Que Publishing; pp. 2-26 and 53-86.*
Marchal; Tip: Convert from HTML to XML with HTML Tidy; Sep. 18, 2003; IBM DeveloperWorks; pp. 1-6.*
Raggett; Clean Up Your Web Pages With HTML Tidy; 2003; W3C. org; pp. 1-12.*
Tidy Man Pages; Jul. 1, 2005; tidy.sourceforge.net; pp. 1-15.*
Raggett; HTML Tidy—Release Notes; Oct. 5, 2002; Sourceforge. net; pp. 1-19.*
Microsoft Computer Dictionary; May 1, 2002; Microsoft Press; pp. 216, 226.*

(Continued)

*Primary Examiner* — Andrew Dyer
(74) *Attorney, Agent, or Firm* — The Steadman Law Firm PLLC

(57) ABSTRACT

A system for representing and generating XML data is provided. The system includes one or more processors and a mapping module configured to execute upon the one or more processors. The mapping module is configured to map each sparsely-encoded XML element of a sparse representation of a document into a complete, valid XML document. The system also includes a defaulting module configured to execute upon the one or more processors. The defaulting module is configured to generate at least one XML element missing in the sparse representation, but required to generate the complete, valid XML document.

20 Claims, 3 Drawing Sheets

(56) References Cited

OTHER PUBLICATIONS

Szolovits, Peter. FindStruct. Dec. 14, 2005. [4 pages] <http://groups.csail.mit.edu/medg/projects/text/findstruct/FindStruct_doc.html>.

Caton, Paul et al. Making Elements from Arbitrary Sections: A Practical Application of XML Topic Maps. Proceedings of the Extreme Markup Languages 2001 Conference, Aug. 12-17, 2001, Montreal, Canada, pp. 55-60.

* cited by examiner

ADAPTIVE PARSING OF SPARSE XML DATA

FIELD OF THE INVENTION

The present invention is related to the field of data processing, and more particularly, to techniques for parsing XML data.

BACKGROUND OF THE INVENTION

XML, the Extensible Markup Language, is a general-purpose specification for creating custom markup languages. XML is said to be extensible in that it has no predetermined format, but rather is a meta-language for describing other languages. Thus, XML enables users to design customized markup languages for various types of documents and to define user-specified elements. One of the benefits provided by XML is that it facilitates the sharing of structured data across different information systems, especially via the Internet.

XML is also used to encode documents and to serialize data. An important constraint, however, is that specifying and reading XML data in a document, even one in which only a small portion of a large schema is specified, requires that a full, nested data structure be specified for the document. As a result, often times the XML is overspecified, especially when default values can be applied. This is especially so in an application-server context when providing metadata to applications developed using the Java™ 2 Platform, Enterprise Edition (J2EE) platform for server programming in the Java™ programming language from Sun Microsystems of Santa Clara, Calif. The J2EE XML data, specified as metadata for J2EE documents—for example, application.xml, web.xml, and ejb-jar.xml—often require the specification of data elements in a deeply-nested structure.

SUMMARY OF THE INVENTION

The invention is directed to systems and methods for representing and generating XML data. One aspect of the invention is a mechanism for allowing XML data to be encoded in a sparse representation. Another aspect is a mechanism for supplying default values for elements that are generated so as to complete the necessary data structure in the context of a complete, valid XML document.

These aspects enable the generation of a sparse document, which can simplify the generation of XML data and thereby save a user time and effort in creating XML data. These aspects also permit the size of data encoding to be reduced. Moreover, these aspects facilitate the reading of a document. Operatively, at parse time, when a sparsely-encoded element is encountered in the document, these aspects can be utilized to map an element to an appropriate nested element, and missing elements can be generated so as to create a complete, valid XML document.

One embodiment is a system for representing and generating XML data. The system can include one or more processors. The system also can include a mapping module configured to execute upon the one or more processors for mapping each sparsely-encoded XML element of a sparse representation of a document into a complete, valid XML document. The system can further include a defaulting module configured to execute upon the one or more processors for generating at least one XML element missing in the sparse representation, but required to generate the complete, valid XML document.

Another embodiment is a computer-implemented method for representing and generating XML data. The method can include determining an XML structure based upon a sparse representation of an XML document, and generating a complete, valid XML document based upon the determined XML structure.

Still another embodiment is a computer-readable medium in which is embedded computer-readable code that when loaded on a computer causes the computer to determine an XML structure based upon a sparse representation of an XML document, and, based upon the determined XML structure, generate a complete, valid XML document.

BRIEF DESCRIPTION OF THE DRAWINGS

There are shown in the drawings, embodiments which are presently preferred. It is expressly noted, however, that the invention is not limited to the precise arrangements and instrumentalities shown in the drawings.

DETAILED DESCRIPTION

The invention is directed to systems and methods that simplify the generation of XML data. More particularly, one aspect of the invention is a mechanism for allowing XML data to be encoded in a sparse representation. Another aspect is a mechanism for supplying default values for elements that are generated so as to complete the necessary data structure in the context of a complete, valid XML document.

The different aspects of the invention, when used in conjunction, enable a user to generate a sparse document, saving the user the time and effort typically required to create XML data. These aspects permit the size of data encoding to be reduced as well as facilitate the reading of the document. At parse time, when a sparsely-encoded element is encountered, the element can be mapped to an appropriate nested element. Moreover, elements missing from the sparse representation can be generated in order to create a complete, valid XML document.

Figure 1:
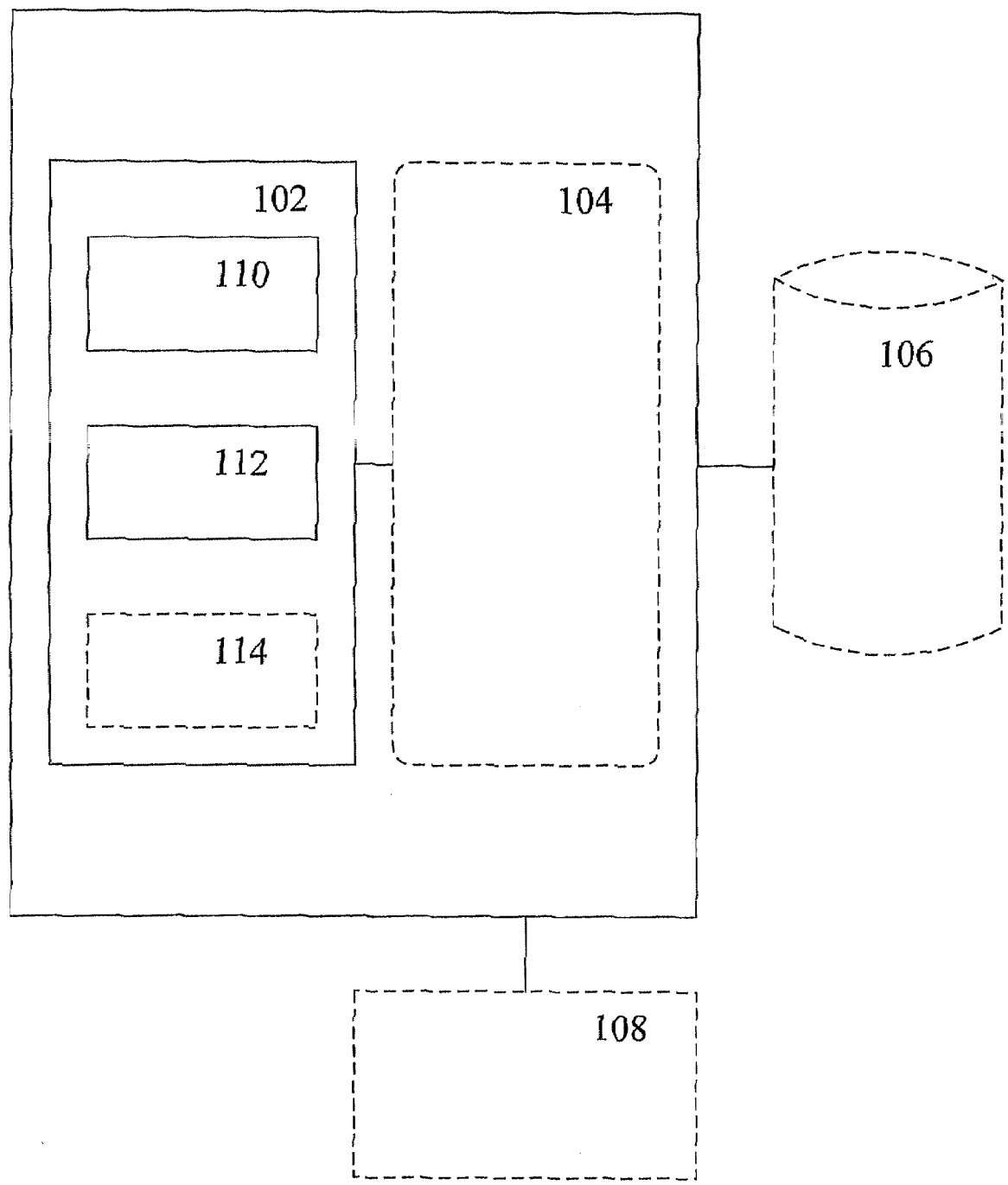
FIG. 1 is a schematic view of a system for generating and representing XML data, according to one embodiment of the invention.

FIG. 1 is a schematic view of a system 100 for representing and generating XML data, according to one embodiment of the invention. Illustratively, the system 100 includes one or more processors 102, each of which can comprise registers, logic gates, and other logic-based circuitry (not explicitly shown) for processing data according to instructions contained in code configured to execute upon the one or more processors. Optionally, the system 100 also can include memory 104, defining primary memory, communicatively linked to the one or more processors 102 for storing data and processor-executable code. The system 100, also optionally, can be communicatively linked to additional memory 106, defining secondary memory, for also storing data and processor-executable code. Optionally, the system 100 can further include one or more input/output (I/O) devices 108 for receiving user-supplied data and instructions and for outputting data to a user.

The system 100 also illustratively includes a mapping module 110 that preferably is implemented in processor-executable code configured to execute upon the one or more processors 102 for performing procedures and functions described herein. Additionally, the system 100 illustratively includes a defaulting module 112 that also is preferably implemented in processor-executable code configured to execute upon the one or more processors 102 for performing other procedures and functions described herein. Alternatively, however, one or both the mapping module 110 and defaulting module 112 can be implemented in dedicated, hardwired circuitry for performing the same procedures and functions. In still other embodiments, the mapping module 110 and/or defaulting module 112 can be implemented in a combination of processor-executable code and hardwired circuitry for performing the identical procedures and functions.

The mapping module 110 is configured to map sparsely-encoded XML elements of a sparse representation of a document into a complete, valid XML document. The defaulting module 110 is configured to generate one or more XML elements missing from the sparse representation, but required to generate the complete, valid XML document. As used herein, the term sparsely encoded XML element denotes any element that can be provided to a mapping layer (here defined by the mapping module 110) and whose placement in an XML document would otherwise be invalid according to established XML parsing rules, but for which there is sufficient information (provided through the mapping layer) to determine a proper location within a complete and valid XML document.

Figure 2:
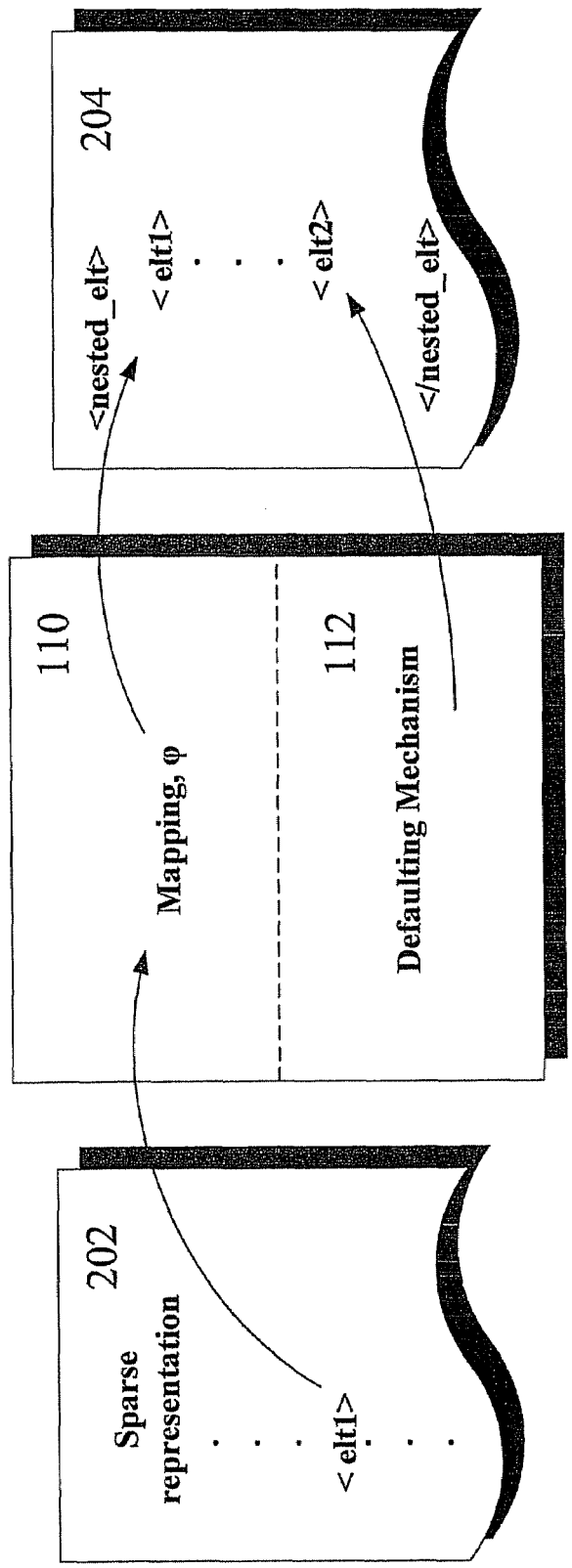
FIG. 2 is a schematic view of certain operative features of the system illustrated in FIG. 1.

Referring additionally to FIG. 2, certain operative features of the system 100 are schematically illustrated. A sparse representation document 202 is initially provided, the sparse representation document including at least one sparsely-encoded XML element, elt1. The mapping module 110 provides a mapping function, φ, that maps the sparsely-encoded XML element, elt1, to an appropriate location within a complete, valid XML document 204. The complete, valid XML document 204, however, may in certain instances require at least one other element not contained in the sparse representation. Accordingly, the defaulting module 112 generates the missing element, elt2, and causes it to be appropriately positioned with the complete, valid XML document 204.

More generally, the process implemented by the system 100 can be described as follows. When a document is parsed and a sparsely-encoded child element or sparsely-encoded attribute element is encountered, that element is mapped by the mapping module 110 to its appropriate nested element within a complete, valid XML document. The defaulting module 112 generates any missing element or elements. These are positioned adjacent to or around the nested element into which the sparsely-encoded element has been placed. After the elements are generated, the sparse element is attached to a data structure at its appropriate location, and the XML document so generated is complete and valid.

The particular mapping φ provided by the mapping module 110 can vary according to the procedural sophistication necessary to determine a correct nesting structure. In certain instances, a non-deterministic selection of the proper elements must be made, using a combination of elements to determine the unique nesting structure. In other cases, the mapping module 110 can utilize a heuristic, for example, by handling an ambiguous mapping by selecting the most recently encountered element.

More specifically, a full XML structure may allow only one location for a sparsely-encoded element. In this case, the mapping module 110 can be configured to place the sparsely-encoded element in a single location. Alternatively, the full XML structure may allow multiple locations for a sparsely-encoded element. In this instance, the mapping module 110 can be configured to place the sparsely-encoded XML element in the closest location beneath the subtree in which the sparsely-encoded XML element was encountered in the document being parsed. That is, the mapping module 110 can place the sparsely-encoded XML element within a nearest location beneath a subtree of the complete, valid XML document that corresponds to a subtree of the sparse representation in which the sparsely-encoded XML element is located.

In another embodiment, a user-defined override may be specified. Upon encountering a particular sparsely-encoded XML element in a particular context within the document 202, the mapping module 110 places the sparsely-encoded element in a subtree according to or provided by the rule specified in the user-defined override.

The defaulting module 112, more particularly, operatively defaults attribute values, per attribute, per data type. Generally, the default is according to a data model or schema provided for the XML data. Elements creating by the defaulting module 112 can be created to minimally satisfy the data model or schema. Moreover, a user-defined override can include a specification for creating elements within the subtree created by the override. Distinct user-defined overrides thus can be specified for the creation of elements wherein the override is keyed to an element type and to the type or types of enclosing elements.

The following is an example of a fully-defined XML document based on a J2EE-specified format for application metadata using an XML format 'application.xml' metadata file: Customary application .xml

```
<application id="Application_ID">
    <display-name>DefaultApplication. ear</display-name>
    <description>Default Application </description>
    <module id="WebModule_1">
      <web>
        <web-uri>DefaultWebApplication .war</web-uri>
        <context-root>/</context-root>
      <web>
    </module>
    <module id="EjbModule_1">
        <ejb>Increment.jar</ejb>
    </module>
    <security-role id="SecurityRole_1">
        <description>All Authenticated users role .</description>
        <role-name>All Role</role-name>
    </security-role>
</application>
```

By comparison, a sparse representation according to the invention would for the same document have the following sparse definition: Sparse application .xml

```
<application>
    <description>Default Application </description>
    <web-uri>DefaultWebApplication .war</web-uri>
    <context-root>/</context-root>
    <ejb>Increment.jar</ejb>
    <role-name>All Role</role-name>
    <description>All Authenticated users role .</de>
</application>
```

The sparse encoding can provide distinct advantages. For example, the sparse encoding is a more compact encoding than that of the fully specified XML. A user or process generating data in a sparse encoding is freed from having to specify unnecessary values, thereby saving time and effort expended. A sparse document typically is easier to read and to modify. Defaulting mechanisms can be modified without modifying XML documents. This latter feature can be advantageous, for example, in the context of a J2EE application that is moved to a new server environment where a different set of default values is appropriate.

In still another embodiment, the system 100 optionally can include a representation-generating module 114 for generating a sparse representation of an XML document, the sparse representation comprising at least one sparsely-encoded XML element. The representation-generating module 114 is shown as being co-located on the same system 100 as the mapping and defaulting modules 110, 112, but it will be readily apparent to one of ordinary skill that the generating module 114 could alternatively be located on a separate system for generating a sparse representation, which is then used by another system utilizing the mapping and defaulting modules 110, 112 to generate a complete, valid XML document from the sparse representation.

Figure 3:
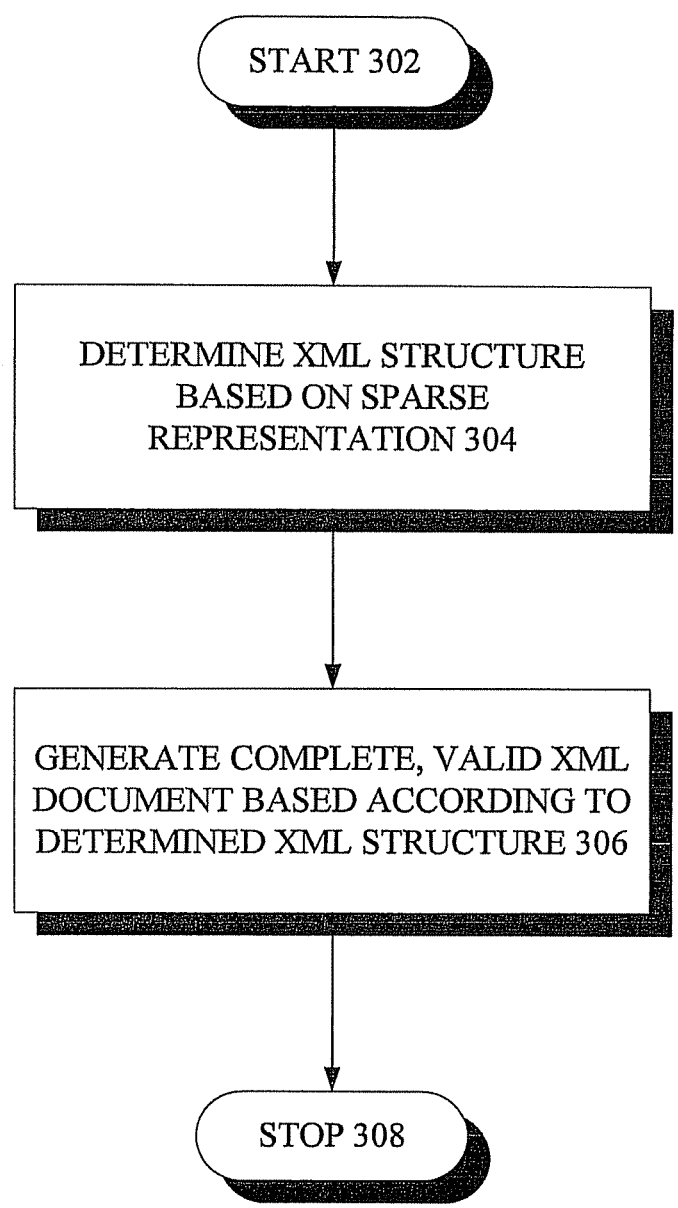
FIG. 3 is a flowchart of exemplary steps in a method for generating and representing XML data, according another embodiment of the invention.

Referring now to FIG. 3, certain method aspects of the invention are illustrated. FIG. 3 is a flowchart of exemplary steps in a method 300 for generating and representing XML data, according another embodiment of the invention.

The method 300 illustratively includes, after the start at step 302, determining an XML structure based upon a sparse representation of an XML document at step 304. The method 300 further includes generating a complete, valid XML document based upon the determined XML structure at step 306. The method 300 illustratively concludes at step 308.

The sparse representation can comprise one or more sparsely-encoded XML elements. Thus, determining the XML structure at step 304 can comprise determining a location within the complete, valid XML document for placing each sparsely-encoded XML element.

Step 304, more particularly, can comprise placing a sparsely-encoded XML element within a nearest location beneath a subtree of the complete, valid XML document that corresponds to a subtree of the sparse representation in which the sparsely-encoded XML element is located. Additionally or alternatively, step 304 can comprise placing a sparsely-encoded XML element within the complete, valid XML document at a position determined by a user-specified rule. Determining position based upon the user-specified rule can comprise identifying an appropriate user-specified rule among a plurality of different user-specified rules, the identification being based upon a context of the sparsely-encoded XML element.

In still another embodiment, the method 300 can include generating at least one XML element not found within the sparse representation, but needed to generate the complete, valid XML document. Generating one or more XML elements can comprise defaulting attribute values per attribute according to a data type specified by a predefined data model or schema.

According to yet another embodiment, the method 300 can include configuring a mapping for determining the XML structure. The mapping can be configured to map sparsely-encoded XML elements of the sparse representations to locations within the complete, valid XML document.

According to a particular embodiment, generating the complete, valid XML document according to the method 300 can comprise parsing a document corresponding to the sparse representation, placing at least one sparsely-encoded element into a nested element of the document based upon the mapping, and generating one or more elements not found in the sparse representation and placing the one or more elements not found in the sparse representation adjacent the nested element. The method 300 also can include generating the sparse representation, wherein the sparse representation comprises at least one sparsely-encoded XML element.

The invention, as already noted, can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention, as also already noted, can be embedded in a computer program product, such as an optically-readable disk, magnetic tape, or other computer-readable medium for storing electronic data. The computer program can comprise computer-readable code, which when loaded in a computer or computer system causes the computer or computer system to carry out the methods described herein. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. A computer-implemented method for representing and generating XML data, the method comprising:

receiving a sparse representation document failing to satisfy a predefined schema, the sparse representation document comprising a plurality of sparsely-encoded XML elements comprising valid XML code portions that are limited to defining attribute values without corresponding tags;

parsing the sparse representation document according to a predefined set of XML parsing rules, wherein the parsing generates a XML document having a valid XML structure according to the predefined schema;

responsive to encountering a first sparsely-encoded XML element among the plurality of sparsely-encoded XML elements during the parsing, applying a mapping function to the first sparsely-encoded XML element, wherein the mapping function maps the first sparsely-encoded XML element to a first nested location in the XML document; and responsive to encountering a second sparsely-encoded XML element among the plurality of sparsely-encoded XML elements during the parsing, applying the mapping function to the second sparsely-encoded XML element, wherein the mapping function utilizes a heuristic to map the second sparsely-encoded XML element to a second nested location in the XML document, and wherein the heuristic handles at least one mapping by selecting a most recently encountered element.

2. The method of claim 1, wherein the first nested location is a location within a subtree of the XML document that corresponds to a subtree of the sparse representation document in which the first sparsely-encoded XML element is located.

3. The method of claim 1, wherein the first nested location is determined by user-specified rule.

4. The method of claim 3, further comprising identifying an appropriate user-specified rule among a plurality of user-specified rules based upon a context of the first sparsely-encoded XML element.

5. The method of claim 1, wherein the mapping function uses a combination of elements to determine a unique nesting structure.

6. The method of claim 1, further comprising generating at least one other XML element defining attribute values required for the XML document.

7. The method of claim 6, wherein generating the at least one other XML element comprises defaulting attribute values per attribute according to a data type specified by the predefined schema.

8. The method of claim 1, wherein the second nested location is a location within a subtree of the XML document that corresponds to a subtree of the sparse representation document in which the second sparsely-encoded XML element is located.

9. A system for representing and generating XML data, the system comprising:
- at least one processor; and
- a computer-readable medium having stored thereon a plurality of instructions for causing the at least one processor to perform steps of:
  - receiving a sparse representation document failing to satisfy a predefined schema, the sparse representation document comprising a plurality of sparsely-encoded XML elements comprising valid XML code portions that are limited to defining attribute values without corresponding tags;
  - parsing the sparse representation document according to a predefined set of XML parsing rules, wherein the parsing generates a XML document having a valid XML structure according to the predefined schema;
  - responsive to encountering a first sparsely-encoded XML element among the plurality of sparsely-encoded XML elements during the parsing, applying a mapping function to the first sparsely-encoded XML element, wherein the mapping function is configured to map the first sparsely-encoded XML element to a first nested location in the XML document; and
  - responsive to encountering a second sparsely-encoded XML element among the plurality of sparsely-encoded XML elements during the parsing, applying the mapping function to the second sparsely-encoded XML element, wherein the mapping function is configured to utilize a heuristic to map the second sparsely-encoded XML element to a second nested location in the XML document, and wherein the heuristic handles at least one mapping by selecting a most recently encountered element.

10. The system of claim 9, wherein the first nested location is a location within a subtree of the XML document that corresponds to a subtree of the sparse representation document in which the first sparsely-encoded XML element is located.

11. The system of claim 9, wherein the first nested location is determined by user-specified rule.

12. The system of claim 9, wherein the mapping function is further configured to use a combination of elements to determine a unique nesting structure.

13. The system of claim 9, wherein the plurality of instructions cause the at least one processor to perform a further step of generating at least one other XML element defining attribute values required for the XML document.

14. The system of claim 13, wherein generating the at least one other XML element comprises defaulting attribute values per attribute according to a data type specified by the predefined schema.

15. A computer-readable storage medium in which is embedded computer-readable code that when loaded on a computer causes the computer to perform steps of:
- receiving a sparse representation document failing to satisfy a predefined schema, the sparse representation document comprising a plurality of sparsely-encoded XML elements comprising valid XML code portions that are limited to defining attribute values without corresponding tags;
- parsing the sparse representation document according to a predefined set of XML parsing rules, wherein the parsing generates a XML document having a valid XML structure according to the predefined schema;
- responsive to encountering a first sparsely-encoded XML element among the plurality of sparsely-encoded XML elements during the parsing, applying a mapping function to the first sparsely-encoded XML element, wherein the mapping function is configured to map the first sparsely-encoded XML element to a first nested location in the XML document; and
- responsive to encountering a second sparsely-encoded XML element among the plurality of sparsely-encoded XML elements during the parsing, applying the mapping function to the second sparsely-encoded XML element, wherein the mapping function is configured to utilize a heuristic to map the second sparsely-encoded XML element to a second nested location in the XML document, and wherein the heuristic handles at least one mapping by selecting a most recently encountered element.

16. The computer-readable storage medium of claim 15, wherein the first nested location is a location within a subtree of the XML document that corresponds to a subtree of the sparse representation document in which the first XML element is located.

17. The computer-readable storage medium of claim 15, wherein the first nested location is determined by user-specified rule.

18. The computer-readable storage medium of claim 15, wherein the mapping function is further configured to use a combination of elements to determine a unique nesting structure.

19. The computer-readable storage medium of claim 15, wherein the computer-readable code when loaded on a computer causes the computer to perform a further step of generating at least one other XML element defining attribute values required for the XML document.

20. The computer-readable storage medium of claim 19, wherein generating the at least one other XML element comprises defaulting attribute values per attribute according to a data type specified by the predefined schema.

* * * * *